US011301525B2

(12) United States Patent
Lv

(10) Patent No.: US 11,301,525 B2
(45) Date of Patent: Apr. 12, 2022

(54) METHOD AND APPARATUS FOR PROCESSING INFORMATION

(71) Applicant: Tencent Technology (Shenzhen) Company Limited, Guangdong (CN)

(72) Inventor: Peili Lv, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 279 days.

(21) Appl. No.: 15/825,396

(22) Filed: Nov. 29, 2017

(65) Prior Publication Data
US 2018/0081978 A1  Mar. 22, 2018

Related U.S. Application Data

(63) Continuation of application No. PCT/CN2017/070764, filed on Jan. 10, 2017.

(30) Foreign Application Priority Data

Jan. 12, 2016 (CN) .......................... 201610017754.7

(51) Int. Cl.
*G06F 16/9535* (2019.01)
*G06N 20/00* (2019.01)
(Continued)

(52) U.S. Cl.
CPC ......... *G06F 16/9535* (2019.01); *G06N 20/00* (2019.01); *G06Q 30/0242* (2013.01);
(Continued)

(58) Field of Classification Search
CPC .... G06F 16/9535; G06N 20/00; G06N 5/022; G06Q 30/0207–0277; G06Q 30/0242; G06Q 30/0251
See application file for complete search history.

(56) References Cited

U.S. PATENT DOCUMENTS 6,286,005 B1 * 9/2001 Cannon ................. G06Q 30/02
455/2.01
7,930,207 B2 * 4/2011 Merriman .......... G06Q 30/0257
705/14.66
(Continued)

FOREIGN PATENT DOCUMENTS

CN 102346899 A 2/2012
CN 103092877 A 5/2013
(Continued)

OTHER PUBLICATIONS

An Overview of Computational Challenges in Online Advertising, Richard E. Chatwin, 2013 American Control Conference (ACC), Washington, DC, USA, Jun. 17-19, 2013.*
(Continued)

*Primary Examiner* — David J Stoltenberg
(74) *Attorney, Agent, or Firm* — Morgan, Lewis & Bockius LLP

(57) ABSTRACT

A method and an apparatus for processing information are provided. The method includes: determining at least one candidate factor, where the factor is a recommendation feature factor; retrieving a processing model, where the processing model is configured to determine a probability of accessing information by one or more users; in response to an incorporation of the candidate factor into the processing model, generating a first accessing probability of recommended information; determining a difference between the first accessing probability and an original accessing probability of the recommended information in association with the processing model; in response to the difference meeting a predetermined condition, converting the candidate factor into a formal factor; modifying the processing model by incorporating the formal factor; and determining target
(Continued)

information, according to the modified processing model, for a delivery of the target information.

17 Claims, 8 Drawing Sheets

(51) Int. Cl.
  *G06Q 30/02*     (2012.01)
  *G06N 5/02*      (2006.01)
  *H04L 67/50*     (2022.01)
(52) U.S. Cl.
  CPC ......... *G06N 5/022* (2013.01); *G06Q 30/0251* (2013.01); *H04L 67/22* (2013.01)

(56)  References Cited

U.S. PATENT DOCUMENTS

| | | | |
|---|---|---|---|
| 8,171,032 B2* | 5/2012 | Herz | G06Q 30/02 707/748 |
| 8,346,607 B1* | 1/2013 | Benson | G06Q 40/08 705/14.71 |
| 8,655,695 B1* | 2/2014 | Qu | G06Q 30/0251 705/7.33 |
| 9,129,227 B1* | 9/2015 | Yee | G06N 3/0472 |
| 9,727,818 B1* | 8/2017 | Liu | G06F 16/9535 |
| 9,734,460 B1* | 8/2017 | Venkataraman | G06Q 10/00 |
| 9,767,489 B1* | 9/2017 | Liu | H04L 67/22 |
| 10,497,024 B2* | 12/2019 | Huang | G06Q 30/0269 |
| 10,671,927 B1* | 6/2020 | Liu | G06F 16/9535 |
| 10,706,439 B1* | 7/2020 | Lerner | G06N 20/20 |
| 10,726,453 B1* | 7/2020 | Liu | G06F 16/9535 |
| 10,740,825 B1* | 8/2020 | Zhang | G06F 16/248 |
| 10,749,977 B1* | 8/2020 | Marra | G06F 16/9535 |
| 10,832,281 B1* | 11/2020 | Langdon | G06Q 30/0251 |
| 2006/0294084 A1* | 12/2006 | Patel | G06Q 30/02 |
| 2008/0086433 A1* | 4/2008 | Schmidtler | G06N 20/10 707/E17.09 |
| 2008/0097834 A1* | 4/2008 | McElfresh | G06Q 30/02 705/7.29 |
| 2008/0103897 A1* | 5/2008 | Flake | G06Q 30/02 705/14.52 |
| 2008/0109285 A1* | 5/2008 | Reuther | G06Q 30/02 705/7.11 |
| 2009/0216847 A1* | 8/2009 | Krishnaswamy | H04M 3/4878 709/206 |
| 2010/0082421 A1* | 4/2010 | Tuladhar | G06Q 20/102 705/14.41 |
| 2010/0138451 A1* | 6/2010 | Henkin | G06Q 30/02 707/803 |
| 2010/0262456 A1* | 10/2010 | Feng | G06Q 30/0229 705/14.3 |
| 2011/0087680 A1* | 4/2011 | Murdock | G06Q 30/02 707/749 |
| 2011/0093331 A1* | 4/2011 | Metzler | G06Q 30/0251 705/14.49 |
| 2011/0184806 A1* | 7/2011 | Chen | G06Q 30/02 705/14.52 |
| 2011/0264510 A1* | 10/2011 | McElfresh | G06Q 30/02 705/14.42 |
| 2011/0313842 A1* | 12/2011 | Avner | G06Q 30/0241 705/14.41 |
| 2012/0042253 A1* | 2/2012 | Priyadarshan | G06Q 30/02 715/733 |
| 2012/0150626 A1* | 6/2012 | Zhang | G06Q 30/0243 705/14.42 |
| 2012/0323677 A1* | 12/2012 | Bottou | G06N 7/005 705/14.45 |
| 2013/0073390 A1* | 3/2013 | Konig | H04L 67/20 705/14.54 |
| 2013/0138507 A1* | 5/2013 | Kumar | G06Q 30/0251 705/14.54 |
| 2013/0191223 A1* | 7/2013 | Harris | G06Q 30/0269 705/14.66 |
| 2013/0211905 A1* | 8/2013 | Qin | G06Q 30/0242 705/14.41 |
| 2013/0262013 A1 | 10/2013 | Ide | |
| 2013/0275580 A1* | 10/2013 | Chamiel | H04L 67/22 709/224 |
| 2013/0346182 A1* | 12/2013 | Cheng | G06Q 30/0242 705/14.41 |
| 2014/0101685 A1* | 4/2014 | Kitts | H04N 21/44213 725/14 |
| 2014/0149223 A1* | 5/2014 | Mathur | G06Q 30/0267 705/14.64 |
| 2014/0207564 A1* | 7/2014 | Dubey | G06Q 30/02 705/14.43 |
| 2014/0236705 A1* | 8/2014 | Shao | G06Q 30/0242 705/14.41 |
| 2014/0278981 A1* | 9/2014 | Mersov | G06Q 30/08 705/14.53 |
| 2014/0372202 A1* | 12/2014 | Hummel | G06Q 30/0242 705/14.41 |
| 2014/0372350 A1* | 12/2014 | Armon-Kest | G06Q 30/02 706/12 |
| 2015/0006286 A1* | 1/2015 | Liu | G06Q 30/0269 705/14.53 |
| 2015/0006294 A1* | 1/2015 | Irmak | G06Q 50/01 705/14.66 |
| 2015/0006295 A1* | 1/2015 | Liu | G06Q 50/01 705/14.66 |
| 2015/0186932 A1* | 7/2015 | Xu | G06Q 30/0251 705/14.66 |
| 2015/0235260 A1* | 8/2015 | Wei | G06Q 30/0246 705/14.45 |
| 2015/0262207 A1* | 9/2015 | Rao | G06Q 30/0241 705/7.32 |
| 2015/0332372 A1* | 11/2015 | Hariri | G06Q 30/0269 705/26.7 |
| 2015/0379423 A1* | 12/2015 | Dirac | G06N 20/00 706/12 |
| 2015/0379429 A1* | 12/2015 | Lee | G09B 5/00 706/11 |
| 2015/0379430 A1* | 12/2015 | Dirac | G06N 20/00 706/12 |
| 2015/0379571 A1* | 12/2015 | Grbovic | G06Q 30/0256 705/14.54 |
| 2016/0019581 A1* | 1/2016 | Wu | G06Q 30/0269 705/14.43 |
| 2016/0019595 A1* | 1/2016 | Wu | G06Q 30/0251 705/14.66 |
| 2016/0071162 A1* | 3/2016 | Ogawa | G06Q 30/0269 705/14.66 |
| 2016/0086094 A1* | 3/2016 | Tsubouchi | G06Q 30/0242 706/52 |
| 2016/0147758 A1* | 5/2016 | Chhaya | G06F 16/337 707/733 |
| 2016/0180248 A1* | 6/2016 | Regan | G09B 5/00 706/12 |
| 2016/0188725 A1* | 6/2016 | Wang | G06F 16/9535 707/734 |
| 2016/0189202 A1* | 6/2016 | Wang | G06Q 10/067 705/14.42 |
| 2016/0189217 A1* | 6/2016 | Burgess | G06Q 30/02 705/14.53 |
| 2016/0189239 A1* | 6/2016 | Bhagwan | G06Q 30/0269 705/14.66 |
| 2016/0210657 A1* | 7/2016 | Chittilappilly | G06Q 30/0246 |
| 2016/0210658 A1* | 7/2016 | Chittilappilly | G06Q 30/0204 |
| 2016/0232575 A1* | 8/2016 | Kirti | G06Q 30/0275 |
| 2016/0239738 A1* | 8/2016 | Feng | G06N 5/022 |
| 2016/0253325 A1* | 9/2016 | Morley | G06F 16/9535 707/749 |
| 2016/0255139 A1* | 9/2016 | Rathod | H04L 51/046 709/203 |
| 2016/0285672 A1* | 9/2016 | Huang | H04L 41/042 |
| 2016/0371589 A1* | 12/2016 | Golbandi | G06F 16/9535 |
| 2017/0140416 A1* | 5/2017 | Ye | G06Q 30/0243 |

(56) References Cited

U.S. PATENT DOCUMENTS

| | | | | |
|---|---|---|---|---|
| 2017/0142044 | A1* | 5/2017 | Ball | G06F 16/9535 |
| 2017/0178197 | A1* | 6/2017 | Hong | G06Q 30/0269 |
| 2017/0178199 | A1* | 6/2017 | Cessna | G06Q 40/123 |
| 2017/0186047 | A1* | 6/2017 | Li | G06Q 30/0275 |
| 2017/0236073 | A1* | 8/2017 | Borisyuk | G06Q 50/01 706/12 |
| 2018/0060696 | A1* | 3/2018 | Chen | G06K 9/6226 |
| 2018/0081978 | A1* | 3/2018 | Lv | G06N 20/00 |
| 2018/0189074 | A1* | 7/2018 | Kulkarni | G06Q 30/02 |
| 2019/0197176 | A1* | 6/2019 | Luo | H04L 63/102 |

FOREIGN PATENT DOCUMENTS

| | | | | |
|---|---|---|---|---|
| CN | 104572734 | A | | 4/2015 |
| CN | 105046277 | A | | 11/2015 |
| CN | 105183772 | A | | 12/2015 |
| CN | 105678587 | A | | 6/2016 |
| CN | 111159564 | A | * | 5/2020 ......... G06F 16/9535 |
| JP | 2011039734 | A | | 2/2011 |
| JP | 2013205170 | A | | 10/2013 |
| KR | 20080043764 | A | | 5/2008 |

OTHER PUBLICATIONS

Web Mining and Text Mining; From Data Mining: Concepts, Models, Methods, and Algorithms, Second Edition; Author Mehmed Kantardzic; Published 2011 by Institute of Electrical and Electronics Engineers.*

A Bayesian Network Model for Optimizing Advertisements Allocation in Intermediate Online Targeted Advertising, Li et al., 978-1-4244-2108-4/08/$25.00 © 2008 IEEE.*

First Japanese Office Action regarding Japanese Application No. 2017-562719 dated Feb. 18, 2019.

Gutierrez-Osuna, Ricardo, L11: Sequential Feature Selection; www.research.cs.tamu.edu/prism/lectures/pr/pr_l11.pdf.

Yukihiro et al.; Feature Evaluation of CTR Prediction Model in Online Advertisement; Proceedings of the Seventh Interntional Workshop on Data Mining for Online Advertising; Article No. 4; Chicago, IL; Aug. 2013.

First Korean Office Action regarding Patent Application No. 10-2017-7034700 dated Oct. 22, 2018. English translation provided by Unitalen Attorneys at Law.

Chang, "Why People Click on Which Pages—A Multinomial Logistic Regression Analysis of Click Stream Data," Korean Journal of Sociology, The Korean Sociological Association, 2005, pp. 101-130.

International Search Report (English & Chinese) and Written Opinion (Chinese) of the ISA/CN, Haidian District, Beijing, dated Apr. 14, 2017.

Nannan, Xie, "Application Research on Intrusion Detection Based on Machine Learning," China Doctoral Dissertations Full-text Database Information Technology, Aug. 15, 2015, 20 pages.

First Chinese Office Action regarding Application No. 201610017754.7 dated Apr. 16, 2020. English translation provided by Unitalen Attorneys at Law.

Tencent Technology, IPRP, PCT/CN2017/070764, Jul. 17, 2018, 6 pgs.

* cited by examiner

METHOD AND APPARATUS FOR PROCESSING INFORMATION

The present application is a continuation of International Patent Application No. PCT/CN2017/070764, filed on Jan. 10, 2017, which claims the priority to Chinese Patent Application No. 201610017754.7, titled "RECOMMENDATION FEATURE DETERMINING METHOD, INFORMATION RECOMMENDATION METHOD AND APPARATUS", filed on Jan. 12, 2016 with the State Intellectual Property Office of the People's Republic of China, both of which are incorporated herein by reference in their entireties.

FIELD

The present disclosure relates to the field of information recommendation technology, and particularly to a method for processing information and an apparatus for processing information.

BACKGROUND

Information recommendation aims to select recommended information with a high accessing probability from multiple pieces of candidate recommended information and deliver the selected recommended information to a user, thus to make delivered information highly matched with the user, thereby promoting the efficiency of information recommendation. For example, advertisement recommendation is a kind of typical information recommendation, that is, to sort a series of candidate advertisements advertised by an advertiser according to the order of the accessing probability, and to deliver an advertisement having the highest accessing probability to the user.

To improve the efficiency of information recommendation, it is necessary to determine a probability of accessing the recommended information by the user in a process of information recommendation. And a factor influencing the accessing probability of the recommended information may be called a recommendation feature, and the recommendation feature mainly includes three types including user, information (such as advertisement) and information presentation position (suck as an advertisement place), with each type of the recommendation feature including specific content. Currently, a processing model including the three types of recommendation features being user, information and information presentation position is built. Then during the process of information recommendation, an available recommendation feature is selected for specific to-be-recommended information and to-be-recommended users, and is incorporated into the processing model, to determine the accessing probability of the to-be-recommended information after being delivered.

It can be seen, to improve the accuracy of determining the accessing probability, what recommendation feature selected to be incorporated into the processing model is important during the process of determining the accessing probability. At present, the recommendation feature to be incorporated into the processing model is selected mainly based on subjective analysis of technicians without a more accurate recommendation feature selection scheme. Therefore, it is important to provide a method for processing information, to accurately select the recommendation feature to be incorporated into the processing model, thereby improving the accuracy of determining the accessing probability subsequently.

SUMMARY

Accordingly, a method for processing information and an apparatus for processing information are provided according to the embodiments of the present disclosure to accurately select a factor to be incorporated into a processing model, thereby improving the accuracy of determining an accessing probability subsequently.

To achieve the above objective, technical solutions in the following are provided by embodiments of the present disclosure.

A method for processing information is provided according to an aspect of the disclosure, the method includes:

determining at least one candidate factor, where the factor is a recommendation feature factor;

retrieving a processing model, where the processing model is configured to determine a probability of accessing information by one or more users;

in response to an incorporation of the candidate factor into the processing model, generating a first accessing probability of recommended information;

determining a difference between the first accessing probability and an original accessing probability of the recommended information in association with the processing model;

in response to a difference meeting a predetermined condition, converting the candidate factor into a formal factor;

modifying the processing model by incorporating the formal factor; and determining target information, according to the modified processing model, for a delivery of the target information.

An apparatus for processing information is provided according to another aspect of the disclosure, the apparatus includes a processor and a memory for storing program instructions, the processor is configured to execute the program instructions to:

determine at least one candidate factor, where the factor is a recommendation feature factor;

retrieve a processing model, where the processing model is configured to determine a probability of accessing information by one or more users;

in response to an incorporation of the candidate factor into the processing model, generate a first accessing probability of recommended information;

determine a difference between the first accessing probability and an original accessing probability of the recommended information in association with the processing model;

in response to a difference meeting a predetermined condition, convert the candidate factor into a formal factor;

modify the processing model by incorporating the formal factor; and determine target information, according to the modified processing model, for a delivery of the target information.

According to another aspect of the disclosure, it is provided a non-volatile storage medium for storing one or more computer programs, the computer programs include instructions executable by a processor having one or more memories; and the processor executes the instructions to perform the above method for processing information.

Based on the above technical solutions, in the embodiments of the disclosure, distinctiveness of the candidate factor on the accessing probability of the recommended information is determined by determining the difference in accessing probability of recommended information between a case before the candidate factor is incorporated into the processing model and a case after the candidate factor is incorporated into the processing model. A candidate factor corresponding to the difference in accessing probability meeting a predetermined condition is determined as a formal factor having greater distinctiveness on the accessing probability of the recommended information, and the formal factor is determined to be incorporated into the processing model. In the embodiments of the disclosure, since the formal factor determined to be incorporated into the processing model has greater distinctiveness on the accessing probability of the recommended information, the selected formal factor has a significant impact on the determination of the accessing probability. By incorporating the formal factor that has a significant impact on the determination of the accessing probability into the processing model, a factor is selected to be incorporated into the processing model more accurately. And the formal factor incorporated into the processing model is used as a reference for selecting a factor during subsequently determining the accessing probability, thereby improving the accuracy of determining the accessing probability.

BRIEF DESCRIPTION OF THE DRAWINGS

The accompanying drawings to be used in the description of the embodiments or the conventional art are described briefly as follows, so that the technical solutions according to the embodiments in the present disclosure or the conventional art become clearer. It is apparent that the accompanying drawings in the following description only illustrate some embodiments of the disclosure. For those skilled in the art, other drawings may be obtained based on these accompanying drawings without any creative work.

DETAILED DESCRIPTION OF EMBODIMENTS

The technical solutions according to the embodiments of the present disclosure will be described clearly and completely as follows in conjunction with the accompany drawings in the embodiments of the present disclosure. It is apparent that the described embodiments are only a part of the embodiments according to the present disclosure. All the other embodiments obtained by those skilled in the art based on the embodiments in the present disclosure without any creative work falls within the protection scope of the present disclosure.

Figure 1:
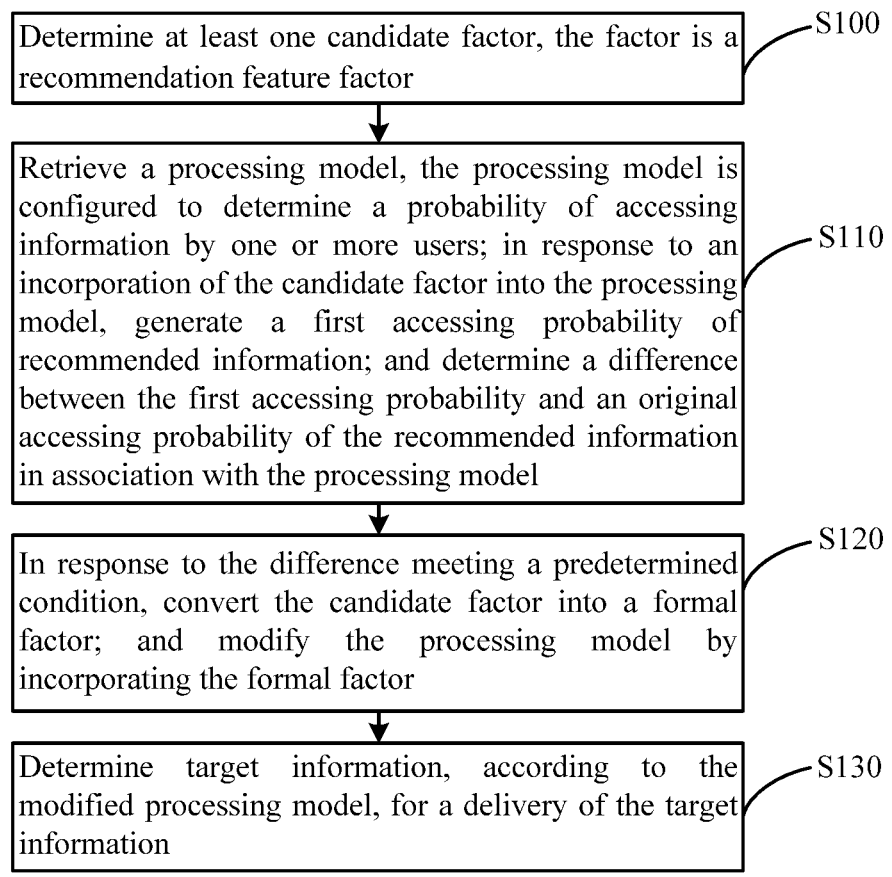
FIG. 1 is a flow chart of a method for processing information according to an embodiment of the present disclosure.

FIG. 1 is a flow chart of a method for processing information according to an embodiment of the present disclosure. The method may be applied in an electronic device having the ability of data processing, and preferably, the method is applied in a recommendation server capable of performing information recommendation. As shown in FIG. 1, the method for processing information may include the following steps S100 to S130.

In step 100, at least one candidate factor is determined, the factor is a recommendation feature factor.

The recommendation feature factor is specific content included in a type of recommendation feature. For example, a user type recommendation feature may include a recommendation feature factor such as age, gender, district, an internet device used, interest reflected by a history accessing and purchasing behavior or the like.

In this embodiment of the present disclosure, the candidate factor is a recommendation feature factor to be analyzed whether to be incorporated into a processing model.

Optionally, the determined at least one candidate factor may belong to a same type of recommendation feature, for example the at least one candidate factor belongs to a user type recommendation feature. Optionally, in the determined at least one candidate factor, a part of the recommendation feature factors belong to the user type recommendation feature while another part of the recommendation feature factors belong to an information presentation position type recommendation feature.

In step S110, a processing model retrieved, the processing model is configured to determine a probability of accessing information by one or more users; in response to an incorporation of the candidate factor into the processing model, a first accessing probability of recommended information is generated; and a difference between the first accessing probability and an original accessing probability of the recommended information in association with the processing model is determined.

The principle for selecting the recommendation feature factor in this embodiment of the present disclosure is: determining a recommendation feature factor having a great impact on an accessing probability of the recommended information as the recommendation feature factor that needs to be incorporated into the processing model.

For example, by taking gender as the recommendation feature factor under the user type recommendation feature, the impact of gender on the accessing probability of the recommended information is determined, that is, it is determined a difference between the accessing probability of the recommended information in a case that the recommendation feature factor of gender is considered and the accessing probability of the recommended information in a case that the recommendation feature factor of gender is not considered. If the difference between the accessing probabilities of the recommended information caused by gender is great, it is considered that, gender is the recommendation feature factor having a great impact on the accessing probability of the recommended information.

The impact of the recommendation feature factor on the accessing probability of the recommended information may be measured by the difference in accessing probability of the recommended information between a case before the recommendation feature factor is incorporated into the processing model and a case after the recommendation feature factor is incorporated into the processing model.

In step S120, in response to a difference meeting a predetermined condition, the candidate factor is converted into a formal factor; and the processing model is modified by incorporating the formal factor.

In the embodiment of the disclosure, after determining the difference in accessing probability of recommended information between a case before the candidate factor is incorporated into a processing model and a case after the candidate factor is incorporated into the processing model, the candidate factor corresponding to a greater difference in accessing probability may be determined as the formal factor has a great impact on the accessing probability of the recommended information. Thus the formal factor is determined to be incorporated into the processing model, that is, the formal factor should be considered when determining an accessing probability of the recommended information after the recommended information is delivered with the processing model.

In this embodiment of the present disclosure, a predetermined condition such as a predetermined accessing probability difference threshold may be set. The candidate factor corresponding to the difference in accessing probability meeting the predetermined condition is determined to be incorporated into the processing model. For example, the candidate factor corresponding to the difference in accessing probability greater than the predetermined accessing probability difference threshold needs to be incorporated into the processing model. Optionally, in this embodiment of the present disclosure, all candidate factors may be sorted based on the differences in accessing probability corresponding to all candidate factors may be sorted, and the candidate factor of which order is within a predetermined scope may be determined to be incorporated into the processing model.

In step S130, target information is determined, according to the modified processing model, for a delivery of the target information.

The method for processing information provided by this embodiment of the present disclosure includes: determining at least one candidate factor, where the factor is a recommendation feature factor; retrieving a processing model, where the processing model is configured to determine a probability of accessing information by one or more users; in response to an incorporation of the candidate factor into the processing model, generating a first accessing probability of recommended information; determining a difference between the first accessing probability and an original accessing probability of the recommended information in association with the processing model; in response to a difference meeting a predetermined condition, converting the candidate factor into a formal factor; modifying the processing model by incorporating the formal factor; and determining target information, according to the modified processing model, for a delivery of the target information.

It can be seen, in this embodiment of the present disclosure, distinctiveness of the candidate factor on the accessing probability of the recommended information is determined by determining the difference in accessing probability of recommended information between a case before the candidate factor is incorporated into the processing model and a case after the candidate factor is incorporated into the processing model. A candidate factor corresponding to the difference in accessing probability meeting a predetermined condition is determined as a formal factor having greater distinctiveness on the accessing probability of the recommended information, and the formal factor is determined to be incorporated into the processing model. In the embodiments of the disclosure, since the formal factor determined to be incorporated into the processing model has greater distinctiveness on the accessing probability of the recommended information, the selected formal factor has a significant impact on the determination of the accessing probability. By incorporating the formal factor that has a significant impact on the determination of the accessing probability into the processing model, a factor is selected to be incorporated into the processing model more accurately. And the formal factor incorporated into the processing model is used as a reference for selecting a factor during subsequently determining the accessing probability, thereby improving the accuracy of determining the accessing probability.

Optionally, the difference in accessing probability of the recommended information between a case before the candidate factor is incorporated into the processing model and a case after the candidate factor is incorporated into the processing model may be characterized by an increase in accesses of the recommended information between a case before the candidate factor is incorporated into the processing model and a case after the candidate factor is incorporated into the processing model. The increase in accesses of the recommended information between a case before the candidate factor is incorporated into the processing model and a case after the candidate factor is incorporated into the processing model may be characterized by a decrease in information entropy of the recommended information between a case before the candidate factor is incorporated into the processing model and a case after the candidate factor is incorporated into the processing model. That is, the decrease in information entropy may be considered as the increase in accesses of the recommended information between a case before the candidate factor is incorporated into the processing model and a case after the candidate factor is incorporated into the processing model.

Figure 2:
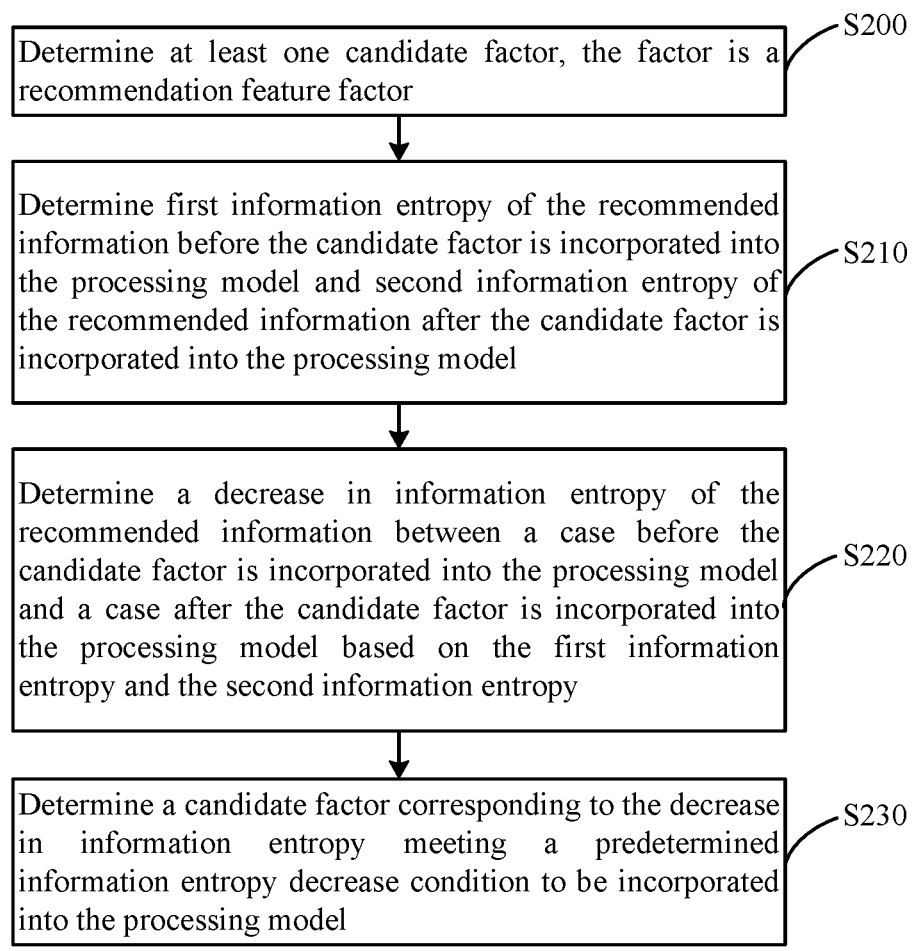
FIG. 2 is a flow chart of a method for processing information according to an embodiment of the present disclosure.

FIG. 2 is a flow chart of a method for processing information according to an embodiment of the present disclosure. As shown in FIG. 2, the method may include the following step S200 to S230.

In step S200, at least one candidate factor is determined, the factor is a recommendation feature factor.

In step S210, first information entropy of the recommended information before the candidate factor is incorporated into the processing model and second information entropy of the recommended information after the candidate factor is incorporated into the processing model are determined.

Optionally, in the embodiment of the disclosure, the first information entropy of the recommended information before the candidate factor is incorporated into the processing model may be determined according to a formula $\Sigma_f\{p(f)H$ (y|f)}, where f denotes the candidate factor, y denotes a set of target values indicating whether the recommended information is accessed, $$y = \begin{cases} 1 & \text{the recommended information is accessed} \\ -1 & \text{the recommended information is not accessed} \end{cases},$$

p(f) denotes a probability of the candidate factor f occurring, $H(y|f) = -\Sigma_y p(y|f) \log(p(y|f))$, and p(y|f) denotes a conditional probability of y under f, such as a probability of the recommended information being accessed and a probability of the recommended information being not accessed under f.

For example, for a candidate factor f (such as gender), an advertisement ad and a set of target values y indicating whether the advertisement is accessed by a user, y may be a set of 1 and −1, where 1 may denote that the advertisement is accessed by the user and −1 may denote that the advertisement is not accessed by the user. Apparently, 1 may be set to denote that the advertisement is not accessed by the user and −1 may denote that the advertisement is accessed by the user. In this embodiment of the present disclosure, information entropy of the advertisement before f is incorporated into the processing model may be calculated according to a formula $\Sigma_f \{p(f) H(y|f)\}$.

Optionally, in the embodiment of the disclosure, the second information entropy of the recommended information after the candidate factor is incorporated into the processing model may be determined according to a formula $-\Sigma_{f,ad} \{p(f,ad) H(y|f,ad)\}$, where ad denotes the recommended information, p(f,ad) denotes a joint probability of f and ad occurring, such as a probability of both the recommended information and f occurring, $H(y|f,ad) = -\Sigma_y p(y|f,ad) \log(p(y|f,ad))$, and p(y|f,ad) denotes a conditional probability of y under f and ad, such as, for a specific ad, a probability of the ad being accessed by a user and a probability of the ad being not accessed by a user under f.

For example, for a candidate factor f, an advertisement ad, and a set of target values y indicating whether the advertisement is accessed by a user, in this embodiment of the present disclosure, information entropy of the advertisement ad after f is incorporated into the processing model may be calculated according to a formula $-\Sigma_{f,ad} \{p(f,ad) H(y|f,ad)\}$.

In step S220, a decrease in information entropy of the recommended information between a case before the candidate factor is incorporated into the processing model and a case after the candidate factor is incorporated into the processing model is determined based on the first information entropy and the second information entropy.

In this embodiment of the present disclosure, the decrease in the information entropy may be obtained by adding the first information entropy and the second information entropy. For example, the first information entropy and the second information entropy may be combined according to the formula $IG = -\Sigma_{f,ad} \{p(f,ad) H(y|f,ad)\} + \Sigma_f \{p(f) H(y|f)\}$, where IG denotes the decrease in information entropy.

The decrease in information entropy corresponds to an increase in accesses of the recommended information between a case before the candidate factor is incorporated into the processing model and a case after the candidate factor is incorporated into the processing model.

In step S230, a candidate factor corresponding to the decrease in information entropy meeting a predetermined information entropy decrease condition is determined to be incorporated into the processing model.

The predetermined information entropy decrease condition is an optional form of a predetermined accessing probability difference condition. For example, in this embodiment of the present disclosure, the candidate factor corresponding to the decrease in information entropy less than a predetermined information entropy decrease value may be determined to be incorporated into the processing model. Optionally, in this embodiment of the present disclosure, all candidate factors may be sorted based on the decrease in information entropy corresponding to each of the candidate factors, and a candidate factor of which order is within a predetermined scope may be determined to be incorporated into the processing model.

Explanations of implementations of the method shown in FIG. 2 are made by taking an example of advertisement delivery hereinafter.

An online advertising system searches an optimum matching among an advertisement, advertisement environment and audiences rapidly and automatically through a set of algorithms. The realization of this automatic optimum matching is based on interactions among multiple kinds of program algorithms such as data mining, information retrieval, text analysis, affective computing, machine learning or the like. From the instant when an audience enters a media, the system performs mathematical simulation of a user model, determines an interest model of the audience through collaborative filtering technology, searches an optimum advertisement by utilizing database retrieval technology, determines relevancy between the advertisement and advertising environment through text analysis technology, and determines a probability of accessing by a user with a logistic regression model to sort the advertisements, finally delivers the advertisement accurately. During the procedure of determining the accessing probability, it is a critical step to select an appropriate feature for a determination model. Generally, features for a processing model include three types: a user type, an advertisement place type and an advertisement type.

A user type feature generally includes age, gender, district, an internet device used, interest reflected by a history accessing and purchasing behavior of a user or the like. The user type feature is generally used for grouping the users finely, thus an interest in advertisements of a user group is learned.

An advertisement place type feature generally includes features such as position, size, context of an advertisement place and the like. The accessing probabilities of different advertisement places are naturally different. And different contexts in an advertisement place also lead to different accessing probabilities of advertisement.

Information gain of the user type feature reflects a difference in the accessing probability of the advertisement accessed by different user groups. Similarly, the information gain of the advertisement place type feature reflects the influence of different advertisement place type features on the accessing probability of the advertisement. In this embodiment of the present disclosure, it is not to determine an overall accessing probability on a user group or an advertisement place type feature, but to determine the accessing probability based on a specific candidate factor of a user type feature and an advertisement place type feature, thereby realizing accurate determination of the accessing probability of every advertisement.

Based on this, the formal factor to be incorporated into the processing model has to be determined in this embodiment of the present disclosure. In the present disclosure, a candidate factor f to be analyzed is selected, and a set y(y=1,−1)

of target values indicating whether the advertisement is accessed by the user is set for a specific advertisement ad.

And then, a decrease in information entropy of the advertisement between a case before the candidate factor f is incorporated into the processing model and a case after the candidate factor f is incorporated into the processing model is determined according to the formula IG=$-\Sigma_{f,ad}\{p(f,ad)H(y|f,ad)\}+\Sigma_f\{p(f)H(y|f)\}$, that is, information gain brought by the candidate factor f for the advertisement ad is determined. Similar processing is performed on each of candidate factors to obtain the decrease in information entropy corresponding to each of the candidate factors. Thus, a candidate factor corresponding to the decrease in information entropy meeting a predetermined information entropy decrease condition is determined to be incorporated into the processing model.

It can be seen, in this embodiment of the present disclosure, priori determination of the accessing probability of the recommended information is performed for the candidate factors, and the candidate factor having a great distinctiveness on the accessing probability is determined as the formal factor, and the formal factor to be incorporated into the processing model is selected accurately, and the accuracy of subsequently determining the accessing probability is improved.

Optionally, after determining the formal factor to be incorporated into the processing model, a posteriori probability of accessing behaviors for the recommended information ad may be calculated according to the following formula:

$$p(y|f), ad) = \frac{p(ad|y, f)p(y|f)}{p(ad|y, f)}.$$

The formula IG=$-\Sigma_f\{p(f,ad)H(y|f,ad)\}+\Sigma_f\{p(f)H(y|f)\}$ is simplified as:

$$IG = -\sum_{f,ad}\{p(f, ad)H(y|f, ad)\} + \sum_f\{p(f)H(y|f)\}$$

$$= \sum_{f,ad}\left\{p(f, ad)\sum_y p(y|f, ad)\log(p(y|f, ad))\right\} -$$

$$\sum_f\left\{p(f)\sum_y p(y|f)\log(p(y|f))\right\}$$

$$= \sum_{f,ad,y}\left\{p(f, ad, y)\log\left(\frac{p(y|f, ad)}{p(y|f)}\right)\right\};$$

that is, $IG = \sum_{f,ad,y}\{p(f, ad, y)\log\left(\frac{p(y|f, ad)}{p(y|f)}\right)\}.$ Therefore, the decrease in information entropy of the recommended information between a case before the candidate factor is incorporated into the processing model and a case after the candidate factor is incorporated into the processing model may be determined according to a formula in this embodiment of $$IG = \sum_{f,ad,y}\left\{p(f, ad, y)\log\left(\frac{p(y|f, ad)}{p(y|f)}\right)\right\}$$

the present disclosure, where IG denotes the decrease in information entropy, f denotes the candidate factor, ad denotes the recommended information, y denotes a set of target values indicating whether the recommended information is accessed, p(f,ad,y) denotes a joint probability of f,ad and y occurring, p(y|f,ad) denotes a conditional probability of y under f and ad, and p(y|f) denotes a conditional probability of y under f.

According to the method for processing information provided in this embodiment of the present disclosure, the recommendation feature to be incorporated into the processing model is selected accurately, thereby improving the accuracy of determining the accessing probability subsequently.

Based on the method for processing information described above, information recommendation, advertisement recommendation for example, is performed after determining the recommendation feature factor to be incorporated into the processing model in this embodiment of the present disclosure.

Figure 3:
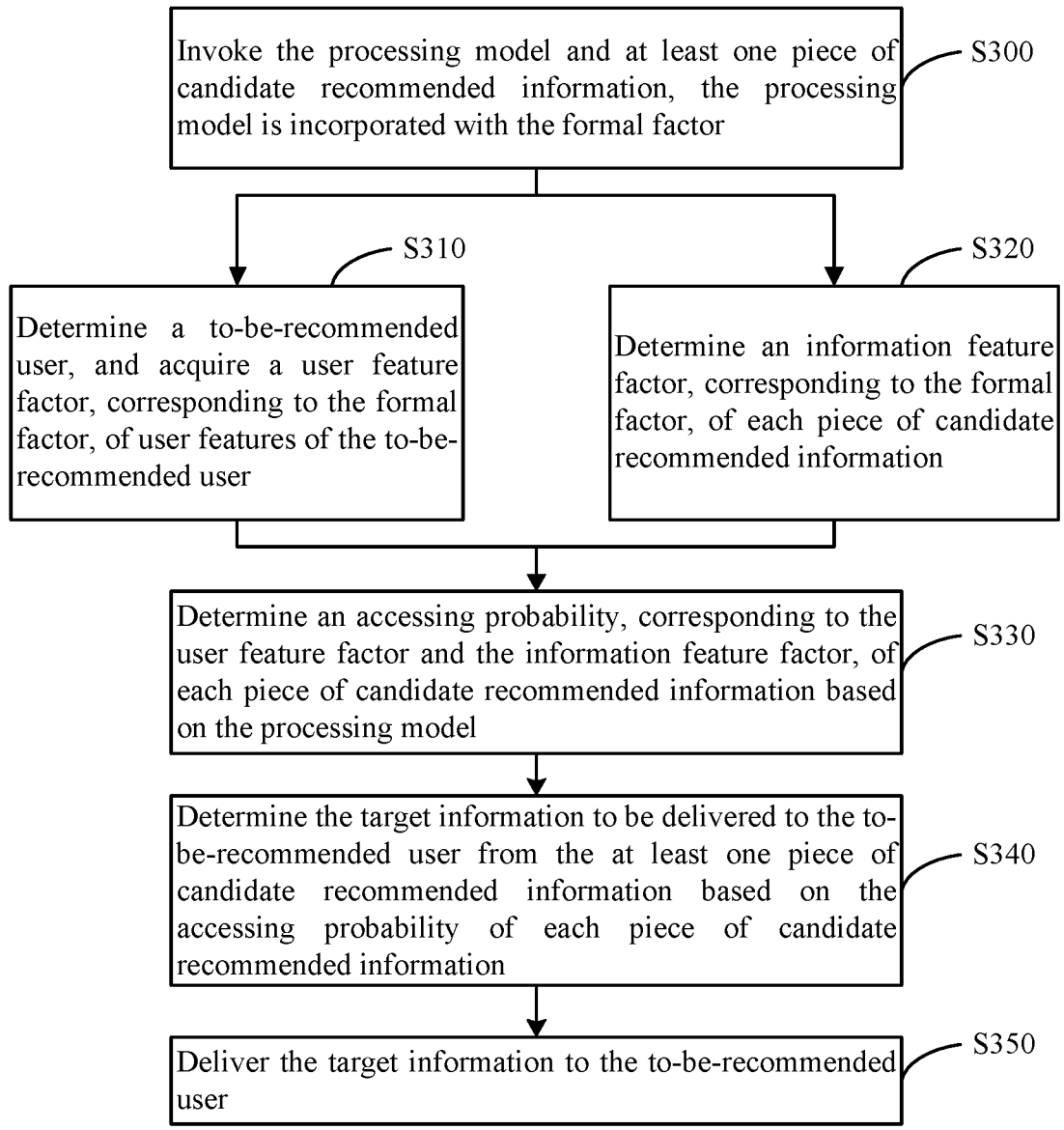
FIG. 3 is a flow chart of a step of determining target information to be delivered to a to-be-recommended user in a method for processing information according to an embodiment of the present disclosure.

FIG. 3 is a flow chart of a step of determining target information to be delivered to a to-be-recommended user in a method for processing information according to an embodiment of the present disclosure. Referring to FIG. 3, the step may include the following steps S300 to S350.

In step S300, the processing model and at least one piece of candidate recommended information are invoked, the processing model is incorporated with the formal factor.

The formal factor may be considered as a reference feature for selecting a feature used in calculation performed by the processing model during information recommendation. And then a user feature factor corresponding to the reference feature is determined from features of a specific to-be-recommended user and an information feature factor corresponding to the reference feature is determined from features of specific recommended information. Accessing probability corresponding to the user feature factor and information feature factor is determined with the processing model.

In step S310, a to-be-recommended user is determined, and a user feature factor, corresponding to the formal factor, of user features of the to-be-recommended user is acquired.

In step S320, an information feature factor, corresponding to the formal factor, of each piece of candidate recommended information is determined.

In step S330, an accessing probability, corresponding to the user feature factor and the information feature factor, of each piece of candidate recommended information is determined based on the processing model.

In step S340, the target information to be delivered to the to-be-recommended user is determined from the at least one piece of candidate recommended information based on the accessing probability of each piece of candidate recommended information.

Optionally, in this embodiment of the present disclosure, all pieces of the candidate recommended information may be sorted according to the accessing probability of each piece of the candidate recommended information, and the recommended information of which order meets a predetermined requirement may be determined as the target information to be delivered to the to-be-delivered user.

In step S350, the target information is delivered to the to-be-recommended user.

Figure 4:
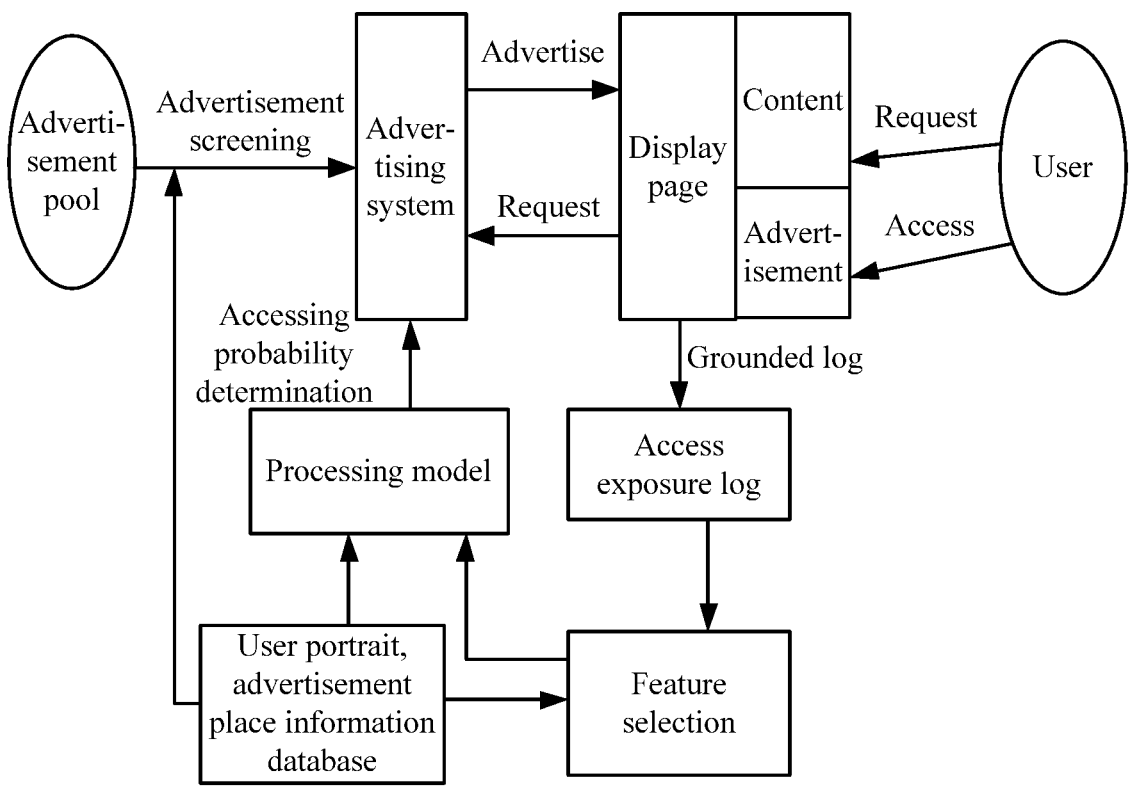
FIG. 4 is a schematic diagram illustrating advertisement delivery.

Advertisement delivery is taken as an example, FIG. 4 is a schematic diagram illustrating advertisement delivery.

In FIG. 4, an advertisement pool is used to store advertising material or the like provided by an advertiser.

An advertising system is used to receive a request from a display page, extracts an advertisement in accordance with a user demand from the advertisement pool according to user information, and performs advertising by referring to an accessing probability provided by a processing model.

The processing model may be used to determine a probability of accessing an advertisement on a page by a user when the user visits the advertising page, and the user visiting the advertising page may be considered as a to-be-recommended user. A logistic regression model is the simplest processing model. By combining a user u, a display page d and a feature of an advertisement a into a feature vector $x^T$ ($x^T=(x_u^T, x_d^T, x_a^T)$) and supposing accessing behaviors of a user is $y \in (0,1)$, the logistic regression may be written as:

$$p(y=1 \mid x^T) = \frac{\exp(x^T w)}{1 + \exp(x^T w)}.$$

The parameter w in the model may be calculated by using stochastic gradient descent (SGD) based on accessing behavior record ($x_u^T, x_d^T, x_a^T, y$) of a user in history. For a new request of the user, a probability $p_0$ of accessing behavior of the user in this request may be determined according to the formula $$p_0 = \frac{\exp(x^T w)}{1 + \exp(x^T w)}.$$

Feature selection is used to determine a candidate factor based on information such as a log of accessing an advertisement by a user, a user feature or the like, and to determine a formal factor having a great distinctiveness on the accessing probability of the advertisement by using the method for processing information provided in embodiments of the present disclosure. The formal factor is incorporated into the processing model, and is used as a reference for selecting the recommended feature when the accessing probability of the advertisement is determined based on the processing model.

An accessing and an exposure behavior to the advertisement by a user are recorded in a form of a log to form an access exposure log. Content of the access exposure log includes a user ID, time of the access or exposure occurred and so on.

A user portrait is used to assign a specific label to every user by analyzing massive basic information data and accessing behavior data of the user, in order to mark an interest, a behavior and other features of the user.

In this embodiment of the present disclosure, by accurately selecting the recommendation feature incorporated into the processing model, the accuracy of the probability of accessing the recommended information by the user determined by the processing model is higher, and the information recommendation is more accurate.

An apparatus for processing information provided in embodiments of the present disclosure is described as follows, which corresponds to the method for processing information described above.

Figure 5:
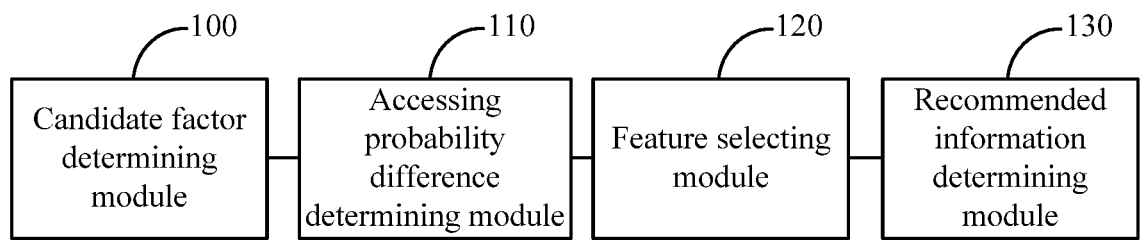
FIG. 5 is a structural diagram of an apparatus for processing information according to an embodiment of the present disclosure.

FIG. 5 is a structural diagram of an apparatus for processing information according to an embodiment of the present disclosure. The apparatus may be applied in an electronic device having the ability of data processing, and preferably, the apparatus is applied in a recommendation server capable of performing information recommendation. Referring to FIG. 5, the apparatus for processing information may include a candidate factor determining module 100, an accessing probability difference determining module 110, a feature selecting module 120 and a recommended information determining module 130.

The candidate factor determining module 100 is configured to determine at least one candidate factor, the factor is a recommendation feature factor.

The accessing probability difference determining module 110 is configured to: retrieve a processing model, where the processing model is configured to determine a probability of accessing information by one or more users; in response to an incorporation of the candidate factor into the processing model, generate a first accessing probability of recommended information; and determine a difference between the first accessing probability and an original accessing probability of the recommended information in association with the processing mode.

The feature selecting module 120 is configured to: in response to a difference meeting a predetermined condition, convert the candidate factor into a formal factor; and modify the processing model by incorporating the formal factor.

The recommended information determining module 130 is configured to determine target information, according to the modified processing model, for a delivery of the target information.

Figure 6:
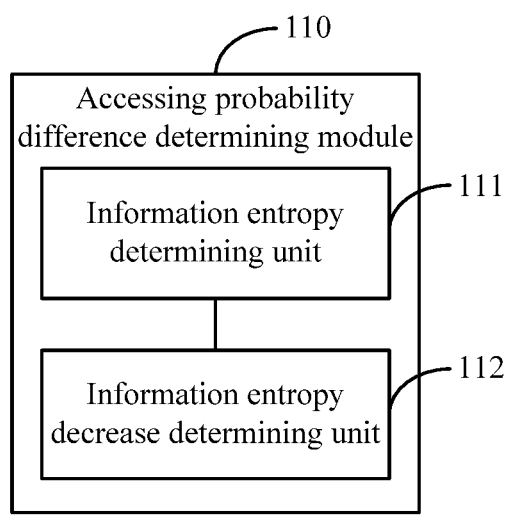
FIG. 6 is a structural diagram of an accessing probability difference determining module according to an embodiment of the present disclosure.

Optionally, FIG. 6 illustrates an optional structure of the accessing probability difference determining module 110 according to an embodiment of the present disclosure. Referring to FIG. 6, the accessing probability difference determining module 110 may include an information entropy determining unit 111 and an information entropy decrease determining unit 112.

The information entropy determining unit 111 is configured to determine first information entropy of the recommended information before the candidate factor is incorporated into the processing model and second information entropy of the recommended information after the candidate factor is incorporated into the processing model.

The information entropy decrease determining unit 112 is configured to determine a decrease in information entropy of the recommended information between a case before the candidate factor is incorporated into the processing model and a case after the candidate factor is incorporated into the processing model based on the first information entropy and the second information entropy, where the decrease in information entropy corresponds to an increase in accesses of the recommended information between a case before the candidate factor is incorporated into the processing model and a case after the candidate factor is incorporated into the processing model.

Figure 7:
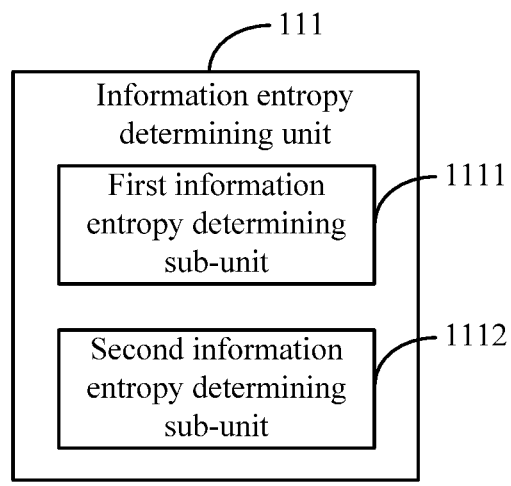
FIG. 7 is a structural diagram of an information entropy determining unit according to an embodiment of the present disclosure.

Optionally, FIG. 7 illustrates an optional structure of the information entropy determining unit 111 according to an embodiment of the present disclosure. Referring to FIG. 7, the information entropy determining unit 111 may include a first information entropy determining sub-unit 1111 and a second information entropy determining sub-unit 1112.

The first information entropy determining sub-unit 1111 is configured to determine the first information entropy of the recommended information before the candidate factor is incorporated into the processing model according to a formula $\Sigma_f \{p(f)H(y \mid f)\}$; and where f denotes the candidate factor, y denotes a set of target values indicating whether the recommended information is accessed, $$y = \begin{cases} 1 & \text{the recommended information is accessed} \\ -1 & \text{the recommended information is not accessed} \end{cases},$$

p(f) denotes a probability of the candidate factor f occurring, H(y|f)=−Σ$_y$p(y|f)log(p(y|f)), and p(y|f) denotes a conditional probability of y under f.

The second information entropy determining sub-unit 1112 is configured to determine the second information entropy of the recommended information after the candidate factor is incorporated into the processing model according to a formula −Σ$_{f,ad}${p(f,ad)H(y|f,ad)}; and where ad denotes the recommended information, p(f,ad) denotes a joint probability of f and ad occurring, H(y|f,ad)=−Σ$_y$p(y|f,ad)log(p(y|f,ad)), and p(y|f,ad) denotes a conditional probability of y under f and ad.

Figure 8:
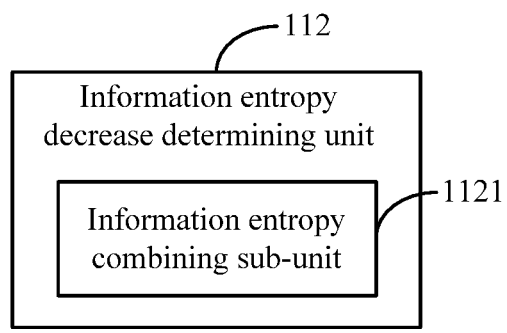
FIG. 8 is a structural diagram of an information entropy decrease determining unit according to an embodiment of the present disclosure.

FIG. 8 illustrates an optional structure of the information entropy decrease determining unit 112. Referring to FIG. 8, the information entropy decrease determining unit 112 may include an information entropy combining sub-unit 1121, configured to determine the decrease in information entropy of the recommended information according to a formula IG=−Σ$_{f,ad}${p(f,ad)H(y|f)}+Σ$_f${p(f)H(y|f)}, where IG denotes the decrease in information entropy.

Figure 9:
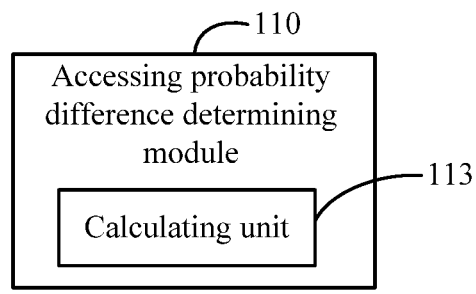
FIG. 9 is a structural diagram of an accessing probability difference determining module according to an embodiment of the present disclosure.

Optionally, FIG. 9 illustrates an optional structure of the accessing probability difference determining module 110 according to an embodiment of the present disclosure. Referring to FIG. 9, the accessing probability difference determining module 110 may include a calculating unit 113, configured to determine a decrease in information entropy of the recommended information between a case before the candidate factor is incorporated into the processing model and a case after the candidate factor is incorporated into the processing model according to a formula $$IG = \sum_{f,ad,y} \left\{ p(f, ad, y) \log\left( \frac{p(y \mid f, ad)}{p(y \mid f)} \right) \right\};$$

and where IG denotes the decrease in information entropy, f denotes the candidate factor, ad denotes the recommended information, y denotes a set of target values indicating whether the recommended information is accessed, $$y = \begin{cases} 1 & \text{the recommended information is accessed} \\ -1 & \text{the recommended information is not accessed} \end{cases},$$

p(f,ad,y) denotes a joint probability of f,ad and y occurring, p(y|f,ad) denotes a conditional probability of y under f and ad, and p(y|f) denotes a conditional probability of y under f.

According to the apparatus for processing information provided in this embodiment of the present disclosure, the recommendation feature to be incorporated into the processing model is selected accurately and the accuracy of subsequently determining the accessing probability is improved.

An apparatus for processing information is provided in another embodiment of the present disclosure, which corresponds to the method for processing information described above.

Figure 10:
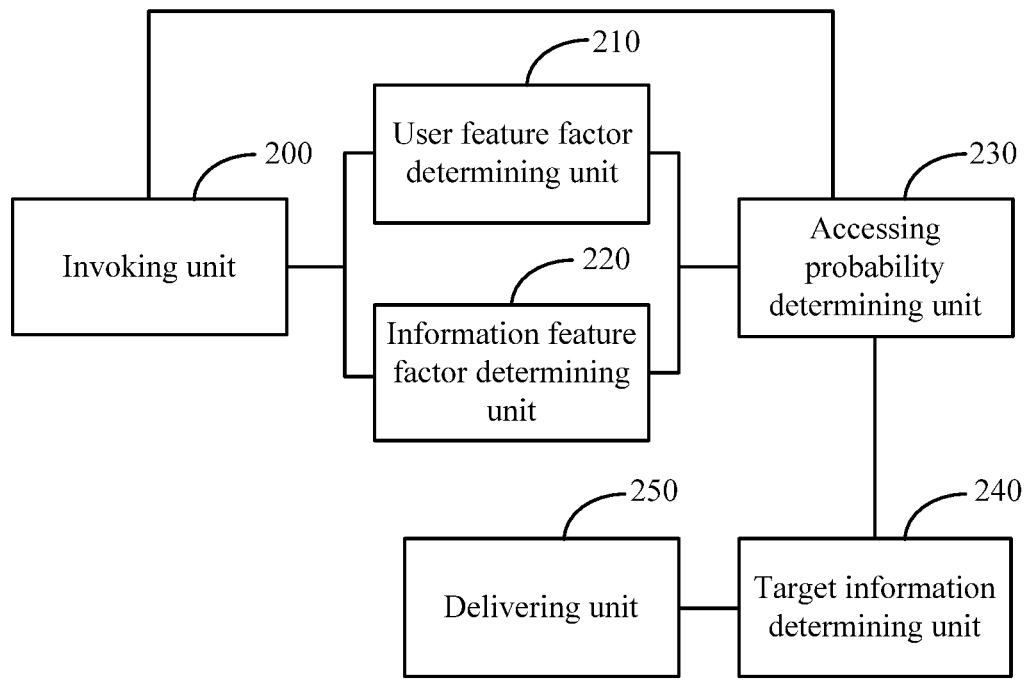
FIG. 10 is a structural diagram of a recommended information determining module of an apparatus for processing information according to an embodiment of the present disclosure.

FIG. 10 is a structural diagram of a recommended information determining module 130 of an apparatus for processing information according to an embodiment of the present disclosure. Referring to FIG. 10, the recommended information determining module 130 may include an invoking unit 200, a user feature factor determining unit 210, an information feature factor determining unit 220, an accessing probability determining unit 230, a target information determining unit 240 and a delivering unit 250.

The invoking unit 200 is configured to invoke the processing model and at least one piece of candidate recommended information, where the processing model is incorporated with the formal factor.

The user feature factor determining unit 210 is configured to determine a to-be-recommended user, and acquire a user feature factor, corresponding to the formal factor, of user features of the to-be-recommended user.

The information feature factor determining unit 220 is configured to determine an information feature factor, corresponding to the formal factor, of each piece of candidate recommended information.

The accessing probability determining unit 230 is configured to determine an accessing probability, corresponding to the user feature factor and the information feature factor, of each piece of candidate recommended information based on the processing model.

The target information determining unit 240 is configured to determine the target information to be delivered to the to-be-recommended user from the at least one piece of candidate recommended information based on the accessing probability of each piece of candidate recommended information.

The delivering unit 250 is configured to deliver the target information to the to-be-recommended user.

Figure 11:
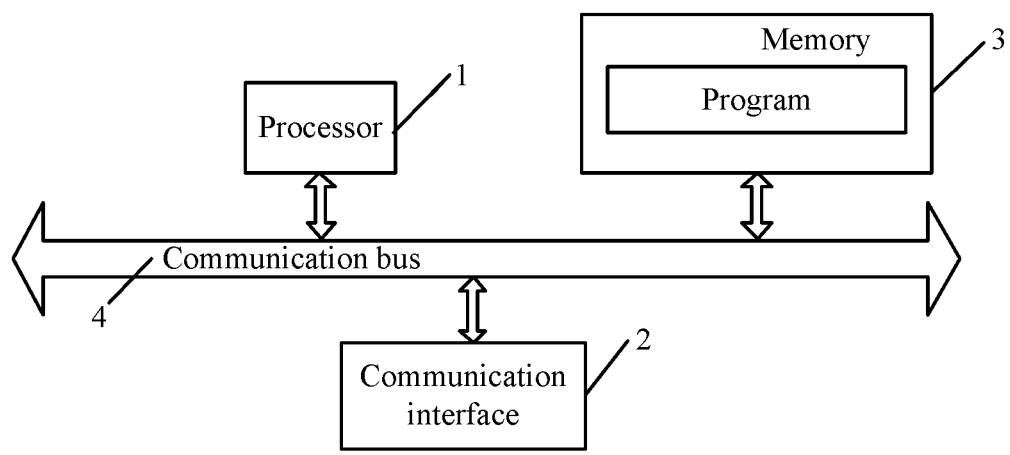
FIG. 11 is a structural diagram of hardware of an electronic device according to an embodiment of the present disclosure.

Optionally, FIG. 11 is a structural diagram of hardware of an electronic device installed with an apparatus for processing information, and the electronic device may be a recommendation server for example. Referring to FIG. 11, the electronic device may include a processor 1, a communication interface 2, a memory 3 and a communication bus 4. The processor 1, the communication interface 2 and the memory 3 are communicated with each other through the communication bus 4. Optionally, the communication interface 2 may be an interface of a communication module, such as an interface of a GSM module. The processor 1 is configured to execute programs. The memory 3 is configured to store programs. The programs may include program codes, and the program codes may include computer operation instructions.

The processor 1 may be a central processing unit (CPU), or an application specific integrated circuit (ASIC), or one or more integrated circuits configured to implement embodiments of the present disclosure.

The memory 3 may include a high-speed random access memory (RAM), or may include a non-volatile memory, such as at least one magnetic disk memory.

The programs are configured to:

determine at least one candidate factor, where the factor is a recommendation feature factor;

retrieve a processing model, where the processing model is configured to determine a probability of accessing information by one or more users;

in response to an incorporation of the candidate factor into the processing model, generate a first accessing probability of recommended information;

determine a difference between the first accessing probability and an original accessing probability of the recommended information in association with the processing model;

in response to a difference meeting a predetermined condition, convert the candidate factor into a formal factor;

modify the processing model by incorporating the formal factor; and determine target information, according to the modified processing model, for a delivery of the target information.

The above embodiments in the specification are described in a progressive manner. Each of the embodiments is mainly focused on describing its differences from other embodiments, and references may be made among these embodiments with respect to the same or similar portions among these embodiments. Descriptions of the apparatus disclosed in the embodiments are simple since the apparatus corresponds to the method disclosed in the embodiments, and related explanations can be found in descriptions of the method.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

Steps of the method or algorithm described in conjunction with the embodiments disclosed herein may be implemented directly with hardware, a software module executed by a processor, or a combination thereof. The software module may be placed in a Random Access Memory (RAM), a memory, a Read Only Memory (ROM), an electrically-programmable ROM, an electrically erasable programmable ROM, a register, a hard disk, a removable disk, a CD-ROM, or a storage medium in any other forms well known in the art.

Based on the above description of the disclosed embodiments, the person skilled in the art is capable of carrying out or using the present application. It is apparent for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A method performed at a computing system having one or more processors and memory, the method comprising:
   determining a plurality of candidate feature factors associated with a plurality of users for inclusion as an on-line advertisement recommendation feature factor, the recommendation feature factor including one or more of: age, gender, district, internet devices used by the plurality of users, user interest reflected by user access history and purchasing behavior;
   retrieving a processing model for determining a probability of advertisement accessing information by the plurality of users;
   for each of the plurality of candidate feature factors:
      generating an initial accessing probability of recommended information using the processing model without the respective candidate feature factor;
      generating a first accessing probability of recommended information using the processing model with the respective candidate feature factor;
      determining a difference between the first accessing probability and the initial accessing probability, including:
         determining first information entropy of the recommended information before the incorporation of the respective candidate feature factor into the processing model, wherein the first information entropy indicates a likelihood that the advertisement was accessed before the incorporation of the candidate feature factor into the processing model;
         determining second information entropy of the recommended information after the respective candidate feature factor is incorporated into the processing model, wherein the second information entropy indicates a likelihood that the advertisement was accessed after the incorporation of the candidate feature factor into the processing model; and
         determining a decrease in information entropy of the recommended information by subtracting the first information entropy from the second information entropy, wherein the decrease in information entropy corresponds to an increase in likelihood of access of the advertisement due to the incorporation of the respective candidate feature factor; and
      in accordance with the determination that the difference meets a predetermined threshold condition, converting the respective candidate feature factor into an on-line advertisement recommendation feature factor;
   modifying the processing model by incorporating the on-line advertisement recommendation feature factor;
   receiving, from a display page, an access request from a first user of the plurality of users;
   in response to the access request:
      determining a target advertisement for the first user based on an accessing probability between a user feature factor of the first user and an on-line advertisement recommendation factor corresponding to the target advertisement in accordance with the modified processing model and one or more of: a data mining algorithm, an information retrieval algorithm, and a text analysis algorithm that are interactively connected with the modified processing model;
      determining a corresponding size and placement features for the target advertisement; and
      delivering the target advertisement to the first user, so that the first user can access the target advertisement with a higher probability.

2. The method according to claim 1, wherein determining the first information entropy comprises:
   determining the first information entropy of the recommended information before the candidate factor is incorporated into the processing model according to a formula $\Sigma_f\{p(f)H(y|f)\}$; and
   wherein f denotes the candidate factor, y denotes a set of target values indicating whether the recommended information is accessed, $$y = \begin{cases} 1 & \text{the recommended information is accessed} \\ -1 & \text{the recommended information is not accessed} \end{cases},$$

p(f) denotes a probability of the candidate factor f occurring, $H(y|f)=-\Sigma_y p(y|f)\log(p(y|f))$, and p(y|f) denotes a conditional probability of y under f.

3. The method according to claim 2, wherein determining the second information entropy comprises:
   determining the second information entropy of the recommended information after the candidate factor is incorporated into the processing model according to a formula $-\Sigma_{f,ad}\{p(f,ad)H(y|f,ad)\}$; and
   wherein ad denotes the recommended information, p(f,ad) denotes a joint probability of f and ad occurring, $H(y|f,ad)=-\Sigma_y p(y|f,ad)\log(p(y|f,ad))$, and p(y|f,ad) denotes a conditional probability of y under f and ad.

4. The method according to claim 3, wherein determining the decrease in information entropy of the recommended information comprises:
   determining the decrease in information entropy of the recommended information according to a formula $IG=-\Sigma_{f,ad}\{p(f,ad)H(y|f,ad)\}+\Sigma_f\{p(f)H(y|f)\}$, wherein IG denotes the decrease in information entropy.

5. The method according to claim 1, wherein determining the difference between the first accessing probability and the initial accessing probability comprises:
   determining a decrease in information entropy of the recommended information between a case before the candidate factor is incorporated into the processing model and a case after the candidate factor is incorporated into the processing model according to a formula $$IG = \sum_{f,ad,y} \left\{ p(f, ad, y)\log\left(\frac{p(y|f, ad)}{p(y|f)}\right)\right\};$$

and
   wherein IG denotes the decrease in information entropy, f denotes the candidate factor, ad denotes the recommended information, y denotes a set of target values indicating whether the recommended information is accessed, $$y = \begin{cases} 1 & \text{the recommended information is accessed} \\ -1 & \text{the recommended information is not accessed} \end{cases},$$

p(f,ad,y) denotes a joint probability of f, ad and y occurring, p(y|f,ad) denotes a conditional probability of y under f and ad, and p(y|f) denotes a conditional probability of y under f.

6. The method according to claim 1, wherein determining the target advertisement comprises:
   invoking the processing model and at least one piece of candidate recommended information, wherein the processing model is incorporated with the on-line advertisement recommendation factor;
   determining a to-be-recommended user, and acquiring a user feature factor, corresponding to the on-line advertisement recommendation factor, of user features of the to-be-recommended user;
   determining an information feature factor, corresponding to the on-line advertisement recommendation factor, of each piece of candidate recommended information;
   determining an accessing probability, corresponding to the user feature factor and the information feature factor, of each piece of candidate recommended information based on the processing model; and
   determining the target advertisement to be delivered to the to-be-recommended user from the at least one piece of candidate recommended information based on the accessing probability of each piece of candidate recommended information.

7. An apparatus, comprising:
a processor;
memory for storing program instructions including:
an invoking unit, configured for invoking a processing model;
a user feature factor determining unit, configured for:
   determining a plurality of candidate feature factors associated with a plurality of users for inclusion as an on-line advertisement recommendation feature factor, the recommendation feature factor including one or more of: age, gender, district, internet devices used by the plurality of users, user interest reflected by user access history and purchasing behavior;
an accessing probability difference determining unit, configured for:
   retrieving the processing model for determining a probability of advertisement accessing information by the plurality of users;
   for each of the plurality of candidate feature factors:
      generating an initial accessing probability of recommended information using the processing model without the respective candidate feature factor;
      generating a first accessing probability of recommended information using the processing model with the respective candidate feature factor;
      determining a difference between the first accessing probability and the original accessing probability, including:
         determining first information entropy of the recommended information before the incorporation of the respective candidate feature factor into the processing model, wherein the first information entropy indicates a likelihood that the advertisement was accessed before the incorporation of the candidate feature factor into the processing model;
         determining second information entropy of the recommended information after the respective candidate feature factor is incorporated into the processing model, wherein the second information entropy indicates a likelihood that the advertisement was accessed after the incorporation of the candidate feature factor into the processing model; and
         determining a decrease in information entropy of the recommended information by subtracting the first information entropy from the second information entropy, wherein the decrease in information entropy corresponds to an increase in likelihood of access of the advertisement due to the incorporation of the respective candidate feature factor;
a feature selecting unit, configured for:
   in accordance with the determination that the difference meets a predetermined threshold condition, converting the respective candidate feature factor into an on-line advertisement recommendation feature factor;
   modifying the processing model by incorporating the on-line advertisement recommendation feature factor;

a target information determining unit, configured for:
  receiving, from a display page, an access request from a first user of the plurality of users;
  in response to the access request:
    determining a target advertisement for the first user based on an accessing probability between a user feature factor of the first user and an on-line advertisement recommendation factor corresponding to the target advertisement in accordance with the modified processing model and one or more of: a data mining algorithm, an information retrieval algorithm, and a text analysis algorithm that are interactively connected with the modified processing model; and
    determining a corresponding size and placement features for the target advertisement; and
  a delivering unit, configured for: delivering the target advertisement to the first user, so that the first user can access the target advertisement with a higher probability,
  wherein the invoking unit, the user feature factor determining unit, the accessing probability difference determining unit, the feature selecting unit, the target information determining unit, and the delivering unit are communicatively coupled to one another in the apparatus, the user feature factor determining unit and the information feature factor determining unit are parallelly coupled between the invoking unit and the accessing probability determining unit, and the invoking unit is also coupled to the accessing probability determining unit directly.

8. The apparatus according to claim 7, wherein determining the first information entropy comprises:
  determining the first information entropy of the recommended information before the candidate factor is incorporated into the processing model according to a formula $\Sigma_f\{p(f)H(y|f)\}$; and
  wherein f denotes the candidate factor, y denotes a set of target values indicating whether the recommended information is accessed, $$y = \begin{cases} 1 & \text{the recommended information is accessed} \\ -1 & \text{the recommended information is not accessed} \end{cases},$$

p(f) denotes a probability of the candidate factor f occurring, $H(y|f)=-\Sigma_y p(y|f)\log(p(y|f))$, and p(y|f) denotes a conditional probability of y under f.

9. The apparatus according to claim 8, wherein determining the second information entropy comprises:
  determining the second information entropy of the recommended information after the candidate factor is incorporated into the processing model according to a formula $-\Sigma_{f,ad}\{p(f,ad)H(y|f,ad)\}$; and
  wherein ad denotes the recommended information, p(f,ad) denotes a joint probability of f and ad occurring, $H(y|f,ad)=-\Sigma_y p(y|f,ad)\log(p(y|f,ad))$, and p(y|f,ad) denotes a conditional probability of y under f and ad.

10. The apparatus according to claim 9, wherein determining the decrease in information entropy of the recommended information comprises:
  determining the decrease in information entropy of the recommended information according to a formula $IG=-\Sigma_{f,ad}\{p(f,ad)H(y|f,ad)\}+\Sigma_f\{p(f)H(y|f)\}$, wherein IG denotes the decrease in information entropy.

11. The apparatus according to claim 7, wherein determining the difference between the first assessing probability and the initial accessing probability comprises:
  determining a decrease in information entropy of the recommended information between a case before the candidate factor is incorporated into the processing model and a case after the candidate factor is incorporated into the processing model according to a formula $$IG = \sum_{f,ad,y} \left\{ p(f, ad, y)\log\left(\frac{p(y|f, ad)}{p(y|f)}\right) \right\};$$

and
  wherein IG denotes the decrease in information entropy, f denotes the candidate factor, ad denotes the recommended information, y denotes a set of target values indicating whether the recommended information is accessed, $$y = \begin{cases} 1 & \text{the recommended information is accessed} \\ -1 & \text{the recommended information is not accessed} \end{cases},$$

p(f,ad,y) denotes a joint probability of f, ad and y occurring, p(y|f,ad) denotes a conditional probability of y under f and ad, and p(y|f) denotes a conditional probability of y under f.

12. The apparatus according to claim 7, wherein determining the target advertisement comprises:
  invoking the processing model and at least one piece of candidate recommended information, wherein the processing model is incorporated with the on-line advertisement recommendation factor;
  determining a to-be-recommended user, and acquire a user feature factor, corresponding to the on-line advertisement recommendation factor, of user features of the to-be-recommended user;
  determining an information feature factor, corresponding to the on-line advertisement recommendation factor, of each piece of candidate recommended information;
  determining an accessing probability, corresponding to the user feature factor and the information feature factor, of each piece of candidate recommended information based on the processing model; and
  determining the target advertisement to be delivered to the to-be-recommended user from the at least one piece of candidate recommended information based on the accessing probability of each piece of candidate recommended information.

13. A non-transitory computer readable storage medium for storing one or more computer programs, wherein the computer programs comprise instructions that, when executed a processor, cause the processor to perform operations comprising:
  determining a plurality of candidate feature factors associated with a plurality of users for inclusion as an on-line advertisement recommendation feature factor, the recommendation feature factor including one or more of: age, gender, district, internet devices used by the plurality of users, user interest reflected by user access history and purchasing behavior;
  retrieving a processing model for determining a probability of advertisement accessing information by the plurality of users;

for each of the plurality of candidate feature factors:
  generating an initial accessing probability of recommended information using the processing model without the respective candidate feature factor;
  generating a first accessing probability of recommended information using the processing model with the respective candidate feature factor;
  determining a difference between the first accessing probability and the initial accessing probability, including:
    determining first information entropy of the recommended information before the incorporation of the respective candidate feature factor into the processing model, wherein the first information entropy indicates a likelihood that the advertisement was accessed before the incorporation of the candidate feature factor into the processing model;
    determining second information entropy of the recommended information after the respective candidate feature factor is incorporated into the processing model, wherein the second information entropy indicates a likelihood that the advertisement was accessed after the incorporation of the candidate feature factor into the processing model; and
    determining a decrease in information entropy of the recommended information by subtracting the first information entropy from the second information entropy, wherein the decrease in information entropy corresponds to an increase in likelihood of access of the advertisement due to the incorporation of the respective candidate feature factor; and
  in accordance with the determination that the difference meets a predetermined threshold condition, converting the respective candidate feature factor into an on-line advertisement recommendation feature factor;
modifying the processing model by incorporating the on-line advertisement recommendation feature factor;
receiving, from a display page, an access request from a first user of the plurality of users;
in response to the access request:
  determining a target advertisement for the first user based on an accessing probability between a user feature factor of the first user and an on-line advertisement recommendation factor corresponding to the target advertisement in accordance with the modified processing model and one or more of: a data mining algorithm, an information retrieval algorithm, and a text analysis algorithm that are interactively connected with the modified processing model;
  determining a corresponding size and placement features for the target advertisement; and
  delivering the target advertisement to the first user, so that the first user can access the target advertisement with a higher probability.

14. The non-transitory computer readable storage medium according to claim 13, wherein determining the first information entropy comprises:
  determining the first information entropy of the recommended information before the candidate factor is incorporated into the processing model according to a formula $\Sigma_f\{p(f)H(y|f)\}$; and
  wherein f denotes the candidate factor, y denotes a set of target values indicating whether the recommended information is accessed, $$y = \begin{cases} 1 & \text{the recommended information is accessed} \\ -1 & \text{the recommended information is not accessed} \end{cases},$$

p(f) denotes a probability of the candidate factor f occurring, $H(y|f)=-\Sigma_y p(y|f)\log(p(y|f))$, and p(y|f) denotes a conditional probability of y under f.

15. The non-transitory computer readable storage medium according to claim 14, wherein determining the second information entropy comprises:
  determining the second information entropy of the recommended information after the candidate factor is incorporated into the processing model according to a formula $-\Sigma_{f,ad}\{p(f,ad)H(y|f,ad)\}$; and
  wherein ad denotes the recommended information, p(f,ad) denotes a joint probability of f and ad occurring, $H(y|f,ad)=-\Sigma_y p(y|f,ad)\log(p(y|f,ad))$, and p(y|f,ad) denotes a conditional probability of y under f and ad.

16. The non-transitory computer readable storage medium according to claim 15, wherein determining the decrease in information entropy of the recommended information comprises:
  determining the decrease in information entropy of the recommended information according to a formula $IG=-\Sigma_{f,ad}\{p(f,ad)H(y|f,ad)\}+\Sigma_f\{p(f)H(y|f)\}$, wherein IG denotes the decrease in information entropy.

17. The non-transitory computer readable storage medium according to claim 13, wherein determining the difference between the first accessing probability and the initial accessing probability comprises:
  determining a decrease in information entropy of the recommended information between a case before the candidate factor is incorporated into the processing model and a case after the candidate factor is incorporated into the processing model according to a formula $$IG = \sum_{f,ad,y} \left\{ p(f, ad, y)\log\left(\frac{p(y|f, ad)}{p(y|f)}\right)\right\};$$

and
wherein IG denotes the decrease in information entropy, f denotes the candidate factor, ad denotes the recommended information, y denotes a set of target values indicating whether the recommended information is accessed, $$y = \begin{cases} 1 & \text{the recommended information is accessed} \\ -1 & \text{the recommended information is not accessed} \end{cases},$$

p(f,ad,y) denotes a joint probability of f, ad and y occurring, p(y|f,ad) denotes a conditional probability of y under f and ad, and p(y|f) denotes a conditional probability of y under f.

* * * * *